United States Patent [19]

Werblinski et al.

[11] Patent Number: 4,481,718

[45] Date of Patent: Nov. 13, 1984

[54] ADJUSTING ARRANGEMENT FOR COMPASS REPEATERS

[75] Inventors: Dieter Werblinski; Heino Hoffmann, both of Kiel, Fed. Rep. of Germany

[73] Assignee: Anshütz & Co. GmbH, Fed. Rep. of Germany

[21] Appl. No.: 496,820

[22] Filed: May 23, 1983

[30] Foreign Application Priority Data

May 21, 1982 [DE] Fed. Rep. of Germany ....... 3219169

[51] Int. Cl.³ .............................................. G01C 19/36
[52] U.S. Cl. .................................... 33/317 R; 33/325
[58] Field of Search ...................... 33/317 R, 316, 321, 33/324, 325, 363 L

[56] References Cited

U.S. PATENT DOCUMENTS

| 2,273,808 | 2/1942 | Harding et al. | 33/325 |
| 2,393,974 | 2/1946 | Curry, Jr. | 33/317 R |
| 2,699,612 | 1/1955 | Kellogg | 33/317 R |

FOREIGN PATENT DOCUMENTS 504753 5/1939 United Kingdom ............. 33/317 R

Primary Examiner—Willis Little
Attorney, Agent, or Firm—Shlesinger, Fitzsimmons & Shlesinger

[57] ABSTRACT

The compass repeaters of a gyro-compass are adjusted by a follow-up motor (1) in response to differential signals between the north-indicating gyro-system and a gyro-system enveloping bowl (18) which is connected to the compass card.

In order to permit adjustment of the compass repeaters and a consistent verification of the relative positions of the master compass card and the compass repeater cards, an electronic control means (10) produces a pulse sequence for stepping motors which corresponds to the differential signals, the stepping motors (1) synchronously adjust the compass cards of master compass and compass repeaters, a sliding contact (11), comprising an interruption point (5), is in wiping contact with a brush (6), and an adjusting power supply (9) supplies a current to brush (6) for adjusting the compass cards, while the follow-up switch (7) is off, and until the interruption point (5) is contacted by the brush (6).

5 Claims, 1 Drawing Figure

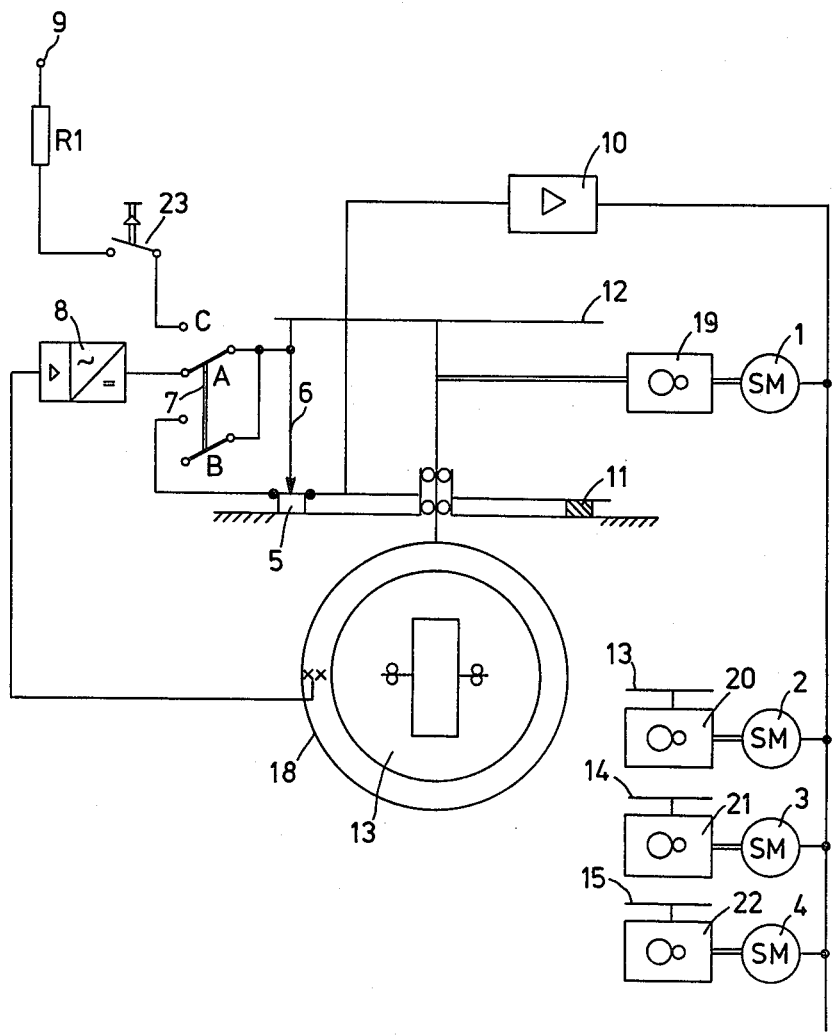

ADJUSTING ARRANGEMENT FOR COMPASS REPEATERS

The invention is directed to an adjusting arrangement for compass repeaters of a gyro-system as specified in the preamble of claim 1.

Compass repeaters are compasses disposed at various locations in the vessel so that it is possible at any time to read the exact course. They are operated in synchronism with a follow-up operation of the master compass card.

Until recently it has been common practice to amplify the analog differential signals, which correspond to the deviation between gyro-system and follow-up operated compass cards, and to supply them to a servomotor which effects follow-up operation of the master compass card through a corresponding gear unit.

This angular position of the master compass card is transmitted to the compass repeater card by means of a synchro system.

This type of follow-up mechanism is expensive and requires a plurality of different components; also, the structure of the adjusting device for the master compass differs basically from that for the compass repeaters so that errors may result therefrom. In addition to that, a rather expensive servomotor has to be employed.

Due to the above-mentioned facts and also because of a number of additional potential errors there may result setting errors of the compass repeaters relative to the master compass. An erroneous indication can only be detected with difficulty. The same holds for the replacement of a malfunctioning compass repeater and the necessary adjusting operations therefor.

The invention is based on the object of providing an adjusting arrangement for compass repeaters of a gyro-system as specified in the preamble of claim 1, which arrangement permits readjustment of the compass repeaters and a consistent verification of the synchronous position between master compass card and compass repeater cards.

A further object resides in providing a simplified structure, a reduction of the number of different components, and also the follow-up mechanism between master compass and compass repeaters is to be made uniform. Simultaneously, a saving of costs is to be achieved. Moreover, after replacement of a compass repeater, adjustment relative to the master compass is to be achieved in a simple manner.

In accordance with the present invention the above-specified object is solved by the features mentioned in the characterizing part of claim 1. Further developments of the invention are specified in the subclaims.

The subject-matter of the invention does without the expensive servomotor, while the stepping motors now used are considerably less expensive to manufacture. Also, all components required to implement the synchro system are omitted.

The usual amplifier for the differential signals has been replaced by another means, viz., electronic motor control means, which produces from the analog differential signals a pulse sequence corresponding to the analog differential signals between gyro-system and compass card. For instance, the frequency or the duration of the pulse sequence may be a measure therefor. This pulse sequence is simultaneously supplied to identically designed stepping motors provided both at the master compass and the compass repeaters. Thereupon a corresponding synchronous follow-up operation of the compass cards of master compass and compass repeaters is achieved by means of the usual gear units.

When a follow-up switch is deenergized, i.e., when the normal follow-up operation is interrupted, a readjustment of all compass cards may be achieved by supplying an adjusting voltage to the electronic control means and thence to the stepping motors of master compass and compass repeaters. In accordance with the invention an already existing sliding contact connected to the master compass card is provided with an interrupting point.

When the associated brush, which supplies the adjusting voltage, contacts the interrupting point of the master compass card, the adjusting voltage will be cut off abruptly, and thus the adjusting operation of the compass card is completed. Since the arrangement for which protection is claimed provides for the master compass card always to stop in a defined position, i.e., at the interrupting point, it is quite simple to verify all compass cards of the compass repeaters as to whether or not they have stopped in the same position. If not, the stepping motor of the corresponding compass repeater has missed one or several steps. When the cause of malfunction (e.g. friction-caused losses in the gearing) has been eliminated, this compass repeater card is set to the value indicated by the master compass card. When follow-up operation is reactivated through the follow-up switch, all cards will synchronously move to the position commanded by the gyro-system. When stepping motors are employed there is an increased risk that a compass repeater, especially the gear unit thereof, will miss one or several steps so that the compass repeater does no longer operate in synchronism with the master compass. It is only by the concept of the present invention that a reliable operation of the described simplified system using the considerably less expensive stepping motors is made possible.

A further advantage resides in that after activation of the interrupting point all compass repeaters may be consistently verified and possibly re-synchronized even when the vessel is lively. So far, this was practically impossible. The same applies when a compass is to be replaced. The compass is exchanged in "interrupting" or "zero" position, and after mounting of a fresh compass it and all compass repeaters are set to the proper position in the described way by depression of a key. It should be noted that due to the fact that a defined zero position is approached when a replacement is effected, manual rotation of the envelope sphere and the risk of resulting damage may be avoided.

It is to be noted that the sliding contact may also be provided with a plurality of interrupting points. Appropriately, a further sliding contact is provided in addition to those already existing, so that the operation of the already existing sliding contacts is not affected. In conjunction with the associated brush this sliding contact acts as a switch, wherein turning-off takes place at the interrupting points. When the follow-up switch is in the ON state, switching-off is bridged. When the follow-up operation via the follow-up switch is turned off, the sliding contact switch is connected in the input circuit of the electronic follow-up means. By depression of the key a predetermined rotary speed is superimposed and the follow-up mechanism will rotate until the sliding contact switch causes an interruption in the interrupting or stop position.

Appropriately, the follow-up control is always supplied from one side only so that only one edge of the sliding contact interrupting point causes turning off. This allows manufacture of the width of the sliding contact interrupting point and thus an adjustment with larger tolerances.

Of course, in addition to the possibilities described above there are further technical means for moving the compass cards of master compass and compass repeaters to a defined zero position, wherein in the case of an adjustment the adjusting time may be longer or shorter. For instance, the synchro signal might be used for automatic control, or the signal of a specific sensor, such as a Hall generator or a field-plate tap, might be used to find the stop position.

An embodiment of the invention is illustrated in the drawing.

The single FIGURE is an overall schematic view of a gyrostabilizer comprising a master compass and three compass repeaters as well as a wiring diagram.

In the drawing, the gyroscope of the master compass is indicated at 17, and the envelope sphere surrounding the same is indicated at 18. By means of a ball bearing 26 the envelope sphere is connected to the compass card 12 of the master compass. At the compass card a sliding contact 11 is indicated which is in contact with a brush 6. The compass card and the envelope sphere 18 joined thereto are rotated by means of a reducing gear unit 19. The gear unit 19 is actuated by a stepping motor 1, which in turn is energized by a pulse train produced by the electronic control means 10.

Furthermore it is apparent from the drawing that the output of the electronic control means 10 is supplied in parallel to the master compass stepping motor 1 to further stepping motors 2, 3 and 4 of compass repeaters. By means of corresponding gear units 20, 21 and 22 the compass cards 13, 14 and 15 of the compass repeaters are synchronously adjusted.

Also, the drawing shows the connection of the electronic control means 10 to a tap 6 of the gyroscope.

On the left-hand side of the wiring diagram of the embodiment of the invention, the dual-controlled follow-up switch 7 is shown, wherein the first or main signal line leads from the electronic unit 8 in the ON state thereof to the brush 6 of the sliding contact 11, which is provided with an interruption point.

Should the sliding contact 11 of the main compass card be accidentally positioned at the interruption point 5, the usual follow-up operation would be interrupted in spite of the ON state of the follow-up switch if the follow-up switch were not designed as a dual-controlled switch, wherein the second contact B of the switch 7 is connected to a line leading to the main signal line upstream of the brush 6.

The switching position according to the drawing shows the normal follow-up operation of the compass, wherein contact B of the follow-up switch may, as explained, bridge the zero position of the sliding contact. When the follow-up switch 7 is deactivated, the follow-up motor will stop.

When the key switch 23 is energized while the follow-up switch 7 is in the OFF position, the adjusting voltage will be supplied from the adjusting voltage source 9 to the first signal line and via the brush 6 to the electronic control unit 10.

Each of the compass cards will now operate independently of one another until the brush 6 in the master compass breaks the contact with the associated interruption point 5. Thereupon each of the motors will stop immediately the mass moment of inertia is sufficiently small. When the key switch 23 is turned off again, the voltage from the adjusting voltage source 9 will also be cut off.

When the follow-up switch 7 is now activated again to reinitiate normal compass follow-up operation, the motor will operate until the card has again reached the position of the gyroscopic system.

We claim:

1. Adjusting arrangement for compass repeaters of a gyro-compass, comprising a follow-up motor (1) which effects the adjustment in dependence on differential signals between the north-indicating gyromagnetic compass and a bowl (18) enveloping the gyro-system, in which the gyro-system is supported in a manner known per se (e.g. by means of a fluid bearing) and is connected to the compass card, characterized by
   (a) electronic control means (10) which produces from said differential signals a corresponding pulse sequence for stepping motors,
   (b) substantially identically designed stepping motors (1 to 4) which in response to the pulse sequence produced by the electronic control means (10) synchronously adjust the compass cards of master compass and compass repeaters, wherein a reduction gear unit is preferably interposed therebetween,
   (c) a per se known sliding contact (11) connected to the compass card of the master compass, said sliding contact being in wiping contact with a brush (6) and including an interruption point (5),
   (d) an adjusting power supply (9) for supplying an adjusting current to the brush (6) so that, when the follow-up switch (7) is in the OFF state, the compass cards are adjusted via the stepping motors (1 to 4) of the master compass and the compass repeaters until the interruption point (5) is contacted by the brush (6).

2. An arrangement as claimed in claim 1, characterized in that said differential signals are d.c. signal applied from the output of a demodulator (8) to the electronic control means (10), which produces a pulse sequence the frequency of which is proportional to the differential signal between desired course and actual course.

3. An arrangement as claimed in claim 1 or claim 2, characterized in that a dual-controlled follow-up switch (7) having parallel switching contacts (A, B) is provided by means of which the differential signals are supplied from the demodulator (8) output to the electronic control means (10) and the brush (6).

4. An arrangement as claimed in claim 1, characterized in that the follow-up switch (7) in its OFF state makes an adjusting contact (C) which upon actuation of a key switch (23) supplies an adjusting current from an adjusting power source (9) to the electronic control means (10), whereby rotation of the compass card (12) of the master compass and simultaneously of the compass cards (13 to 15) of the compass repeaters is effected until the sliding contact (11) of the compass card contacts the interruption point (5 . . . ).

5. An arrangement as claimed in claim 4, characterized in that the adjusting current line includes a resistor (R1) which is connected between key switch (23) and adjusting power supply (9) and whose resistance determines the adjusting rate when the key switch is depressed.

* * * * *